Patented Oct. 29, 1929

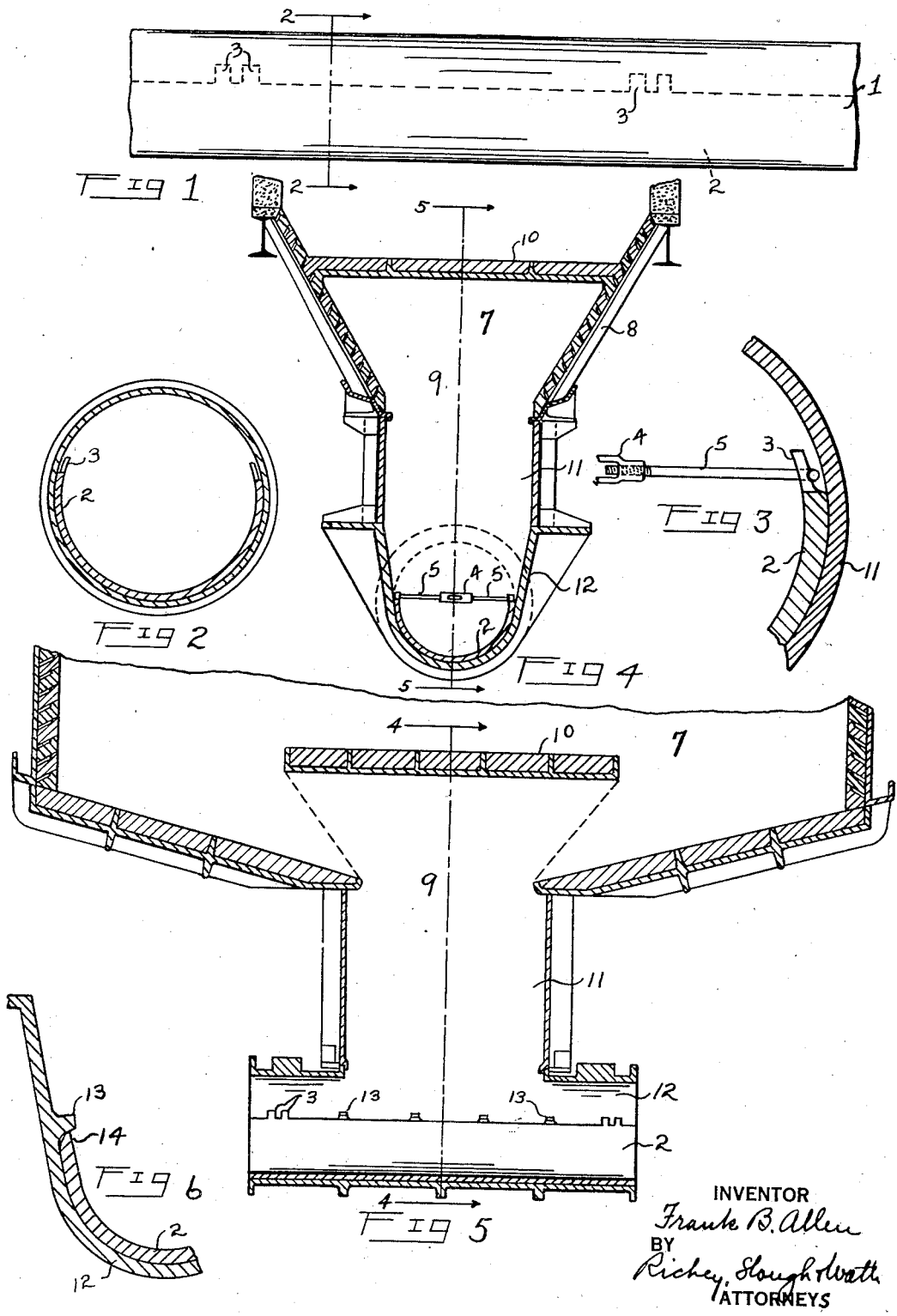

1,733,573

UNITED STATES PATENT OFFICE

FRANK B. ALLEN, OF LOWER MERION TOWNSHIP, MONTGOMERY COUNTY, PENNSYLVANIA, ASSIGNOR, BY MESNE ASSIGNMENTS, TO THE ALLEN-SHERMAN-HOFF COMPANY, OF PHILADELPHIA, PENNSYLVANIA, A CORPORATION OF PENNSYLVANIA

COMPOSITE CONDUIT AND METHOD OF MAKING THE SAME

Application filed June 26, 1925. Serial No. 39,870.

This invention relates to lined conduits, sluiceways and the like and to liners and the method of assembling the same therein.

It is frequently desirable to employ conduits, sluiceways and similar passages constructed from material which would be subject to errosion or corrosion by substances carried therein. It has, however, been difficult heretofore to provide liners for such devices which are satisfactory in use and at the same time inexpensive to make and install. By my invention, however, I am enabled to construct relatively inexpensive conduits, pipes, sluiceways and similar passages and easily and cheaply to assemble therein liners resistant to the action of substances which are to be carried thereby.

My invention has broad application but is particularly applicable to devices for handling comminuted material containing liquid, for example wet ashes, from a fuel burning furnace. Such material usually contains acids of sulphur which readily attack steel but do not rapidly corrode cast iron. Steel conduits, pipes or sluiceways are preferable to cast iron because of their lower initial cost but heretofore it has not been possible, so far as I am aware, to line such conduits, and particularly those of curved or circular cross section or in the form of pipes, with cast iron.

In the drawings forming a part of this specification:

Figure 1 is a side elevation of one form of device embodying my invention;

Figure 2 is a sectional view taken on line 2—2 of Fig. 1;

Figure 3 is a fragmentary enlarged detail view of this form of my invention, partly in section;

Figure 4 is a transverse sectional view taken on line 4—4 of Fig. 5 and showing a modified form of device embodying my invention;

Figure 5 is a vertical longitudinal section of the form of device shown in Fig. 4; and Figure 6 is a fragmentary enlarged detail view showing how the conduit liner is held in place.

Referring first to Figs. 1, 2 and 3, 1 designates a conduit circular in cross section and composed of material which may be subject to attack by substances to be handled therein. Disposed within the conduit or pipe 1 is one or more sections of liners 2. Each section is curved in cross section and is preferably greater than a semi-circle, since when the liner is inserted in the conduit in a contracted condition and then outward forces are applied to the side walls thereof, the entire liner body will more readily seat itself in the conduit and tend to lock itself in position. Preferably the outside diameter of the section 2 is substantially the same as the inside diameter of the conduit 1. At the side edges and preferably integral therewith are lugs 3 preferably arranged in pairs, closely adjacent to each other, the outer surface of these lugs 3 being spaced inwardly from the outer surface of the section 2. Pairs of these lugs 3 are disposed opposite to each other on each section 2 at one or more places, as may be desired. The liner 2 may be composed of any material resistant to the action of the material to be handled by the conduit. For example, in the case of handling ashes from a furnace mixed with water and acids of sulphur the conduit 1 may be composed of steel and the liner 2 of cast iron.

To assemble the liner 2 in conduit 1, I provide a turnbuckle 4 having arms 5 to extend between opposite pairs of lugs 3 on liner 2 at either end of the arms 5 to engage with the outside surfaces of the lugs. After the turnbuckle with its arms and plates is assembled with the lugs 3 the turnbuckle is moved to draw the edges of the liner 2 inwardly or to move them toward each other, whereupon the liner is contracted sufficiently to permit it to be inserted within the conduit 1 and suitably positioned therein. When the turnbuckle 4 is removed and the edges of the liner 2 are permitted to return to their normal position, these edges contact with the portion of the conduit and force the liner 2 into close contact with the inner surface of the conduit throughout substantially the entire extent of the liner, there being sufficient expansive forces in the liner walls, when the turnbuckle is removed, to spread the liner against the conduit under pressure to prevent movement of the liner therein.

I have selected cast iron as the preferred material for the liner not only because it resists the wear and corrosion due to the passage of mixtures of liquids and solids therealong but also because of its substantially rigid nature. When the liner is substantially semi-circular in form and of sufficient diameter for the intended volume of materials to be conveyed it possesses the property of being substantially rigid, that is, it is contractible to a limited extent without breakage. I have taken advantage of this property in what I believe to be a novel and highly advantageous manner. The liner is made with its outer horizontal diameter slightly greater than the corresponding dimension of the outer supporting shell or support. The liner is then contracted along its horizontal diameter sufficiently for the liner to be inserted in the shell or support. Then the liner is permitted to expand against the shell or support, thereby relieving some but not all the forces set up therein during the contraction. Enough of these forces remain unrelieved to cause the liner to press against the shell or support and to maintain the liner in position under what I have herein referred to as "compression."

I thus work within the narrow range in which the cast iron liner can be contracted without breakage and so proportion the size of the liner with respect to the shell or support that on the one hand it can be contracted within that range and inserted in a shell or support and on the other hand it will maintain itself in the shell or support by unrelieved compression forces and without the use of any securing means such as bolts and the like.

Referring now to Figs. 4, 5 and 6 wherein I have illustrated my invention as applied to a hopper for a fuel burning furnace, 7 designates a hopper having walls 8 and a discharge opening 9 in the lower portion thereof. A cross wall 10 is disposed above the opening in the path of discharge of the material and connects walls 8 of the hopper, but is spaced from the side hopper walls and the bottom walls. Beneath the opening 9 and cross wall 10 is disposed a connecting conduit 11 which communicates with the hopper and a conduit 12 and which is curved in cross section. The conduit 12 is preferably greater than a semicircle but less than a complete circle and open at the top to receive material discharged from the hopper through opening 9. The conduit 11 connects the hopper with conduit 12. Within conduit 12 is disposed a liner 2 resembling in practically all essential details the liner 2 of Figs. 1, 2 and 3. The liner 2 is preferably formed of cast iron which is not readily corroded when brought into contact with sulphur acids or the like, as is the case when steel conduits having no liners are used. By my invention I provide a steel conduit lined with a removable cast iron liner thereby increasing the useful life of the conduit and providing for quick accessibility for repair and replacing liners or liner sections.

The liner is assembled within the conduit 12 in a manner similar to the liner shown and described in Figs. 1, 2 and 3, the liner being first contracted by drawing its edges toward each other, then mounting the liner in this contracted condition within the conduit 12, and then releasing the edges of the liner so that it will position itself within the conduit as already described.

Referring to Fig. 6 I have shown in section lugs 13 formed integrally with the conduit 12 on its inner surface and arranged at intervals as shown in Fig. 5. The under surfaces of the lugs slope upwardly and it is against these surfaces that the sloping edges 14 of the liner 2 bear and by which the liner 2 is forced down into the conduit 12. It will be seen therefore that the lugs serve to normally seat the liner after the latter has been released within the conduit.

Having thus described my invention so that those skilled in the art may be enabled to practice the same, what I desire to secure by Letters Patent is defined in what is claimed.

What is claimed is:

1. A metal liner for conduits which is curved in cross-section and is contractile, and lugs at the side edges for engagement with contracting means.

2. A metal liner for conduits which is curved in cross-section and has opposite inwardly disposed pairs of lugs on its edges.

3. A contractile metal liner for conduits which is curved and greater than a semi-circle in cross-section and lugs at the side edges thereof for engagement with contracting means.

4. A contractile metal liner for conduits which is curved and greater than a semi-circle in cross-section, and has pairs of inwardly disposed lugs on its side edges for engagement with contracting means.

5. A conduit comprising an outer supporting shell and an inner trough-shaped liner of normally greater width than the inside of the shell and maintained under compression thereby, and abutments on the inside of the shell engaged by the edges of the liner.

6. A material conveying conduit comprising a supporting member and a substantial semi-circular cast-iron liner therein so formed as to be sufficiently contractible to permit of its assembly in the supporting member, and as to be maintained in the latter under compression.

7. A conveyor for handing solids and liquids comprising a supporting member and a cast-iron trough shaped liner therein, the liner being of such diametrical dimensions with respect to the support that it may be contracted without breakage and inserted in the support and that it will maintain itself in position in the support by unrelieved stresses set up in itself during the said contraction.

8. A conveyor for handling solids and liquids comprising a supporting member and a cast-iron open topped trough shaped liner maintained therein by unrelieved compression stresses in the liner, the liner having a normal outside width slightly greater than the inside width of the supporting member and being contractible sufficiently for insertion in the supporting member.

In testimony whereof I hereunto affix my signature this 8th day of June, 1925.

FRANK B. ALLEN.